United States Patent [19]

Kulprathipanja

[11] Patent Number: 4,606,740

[45] Date of Patent: Aug. 19, 1986

[54] SEPARATION OF POLAR GASES FROM NONPOLAR GASES

[75] Inventor: Santi Kulprathipanja, Hoffman Estates, Ill.

[73] Assignee: UOP Inc., Des Plaines, Ill.

[21] Appl. No.: 723,397

[22] Filed: Apr. 15, 1985

[51] Int. Cl.$^4$ .............................................. B01D 53/22
[52] U.S. Cl. .......................................... 55/16; 55/68; 55/73; 55/158
[58] Field of Search .................... 55/16, 68, 73, 158; 210/490, 500.2, 506; 427/316, 324, 412.2, 444; 428/36, 373, 391, 393–395, 405

[56] References Cited

U.S. PATENT DOCUMENTS

| | | | |
|---|---|---|---|
| 3,133,132 | 5/1964 | Loeb et al. | 264/49 |
| 3,133,137 | 5/1964 | Loeb et al. | 264/233 |
| 3,335,545 | 8/1967 | Robb et al. | 55/158 X |
| 3,457,180 | 7/1969 | Kretz et al. | 252/301.2 |
| 3,556,305 | 1/1971 | Shorr | 210/490 |
| 3,625,734 | 12/1971 | Ward, III | 55/16 X |
| 3,653,180 | 4/1972 | Juliano et al. | 55/16 |
| 3,656,993 | 4/1972 | Edwards et al. | 427/316 |
| 3,810,775 | 5/1974 | Uhl et al. | 427/324 X |
| 3,862,030 | 1/1975 | Goldberg | 210/24 |
| 3,878,104 | 4/1975 | Guerrero | 210/323 |
| 3,993,566 | 11/1976 | Goldberg et al. | 210/433 M |
| 4,032,454 | 6/1977 | Hoover et al. | 210/323 R |
| 4,098,931 | 7/1978 | Yoshida et al. | 427/324 |
| 4,170,559 | 10/1979 | Kroplinski et al. | 55/158 X |
| 4,230,463 | 10/1980 | Henis et al. | 55/16 |
| 4,243,701 | 1/1981 | Riley et al. | 427/244 |
| 4,302,334 | 11/1981 | Jakabhazy et al. | 210/500.2 |
| 4,341,605 | 7/1982 | Solenberger et al. | 204/98 |
| 4,388,256 | 6/1983 | Ishida et al. | 210/500.2 X |
| 4,430,807 | 2/1984 | Davis et al. | 55/16 X |
| 4,517,142 | 5/1985 | Baniel | 210/500.2 X |
| 4,549,012 | 10/1985 | Sharma | 210/500.2 X |

*Primary Examiner*—Robert Spitzer
*Attorney, Agent, or Firm*—Thomas K. McBride; John F. Spears, Jr.; Raymond H. Nelson

[57] ABSTRACT

The separation of polar gases from nonpolar gases may be effected by passing a mixture of nonpolar gases over the face of a multicomponent membrane at separation conditions. The multicomponent membrane which is used to effect the separation will comprise a mixture of a glycol plasticizer having a molecular weight of from about 200 to about 600 and an organic polymer cast on a porous support. The porous support is pretreated prior to casting of the mixture thereon by contact with a polyhydric alcohol whereby the pores of the support are altered, thus adding to the increased permeability of the polar gas.

22 Claims, No Drawings

SEPARATION OF POLAR GASES FROM NONPOLAR GASES

The Government of the United States of America has rights in this invention pursuant to Contract No. DE-AC07-82ID12422 awarded by the U.S. Department of Energy.

BACKGROUND OF THE INVENTION

The separation of fluids, either in gaseous or liquid form, has become increasingly important, especially in fields involving the purification of liquids. The process for the separation of liquids involves the utilization of a reverse osmosis system such as the purification of water and especially saline water or the removal of impurities from fluids such as blood in the field of dialysis. When utilizing reverse osmosis in the purification of water such as saline water, a pressure in excess of the osmotic pressure of the saline water feed solution is applied to the solution which is prepared from purified water by a semipermeable membrane. The purified water thereby diffuses through the membrane while the sodium chloride molecules or other impurities which may be present in the water are retained by the membrane. Various semipermeable membranes are now being used in commercial processes for performing separations by the reverse osmosis treatment of aqueous solutions either for a portion of relatively pure water or for concentration of a liquid solution being treated, or both. An example of the semipermeable membranes which are used will include the early Loeb-type membranes which are fashioned from cellulose diacetate by the process such as described in U.S. Pat. Nos. 3,133,132 and 3,133,137. These Loeb-type membranes comprise an asymmetric type which are characterized by a very thin, dense surface layer or skin which is supported upon an integrally attached, much thicker supporting layer. In addition to this type of semipermeable membrane, other types of membranes which are in use will include those which have been fabricated from polyamides, polyimide, polyphenyl esters, polysulfonamides, polybenzimidazole, polyarylene oxides, polyvinylmethyl ether and other polymeric organic materials.

In addition to the reverse osmosis system which is employed for the separation of liquids, it is also possible to separate various gases which are present in a gaseous feed mixture.

It is taught in U.S. Pat. No. 4,243,701 to Riley et al. that certain membranes may also be utilized for the separation of various gases. The separation of a gas mixture utilizing a membrane is effected by passing a feed stream of the gas across the surface of the membrane. Inasmuch as the feed stream is at an elevated pressure relative to the effluent stream, a more permeable component of the mixture will pass through the membrane at a more rapid rate than will a less permeable component. Therefore, the permeate stream which passes through the membrane is enriched in the more permeable component while, conversely, the residue stream is enriched in the less permeable component of the feed.

Another type of separation process in which various components of fluid mixtures are separated involves the use of adsorbents such as molecular sieves. In the adsorption type of process, the adsorption exhibits a selectivity for one component of the mixture over another or, with a molecular sieve, one component is retained more than other components. The adsorbent may be employed in the form of a dense compact fixed bed which is alternatively contacted with the feed mixture and desorbent materials. In one embodiment, the adsorbent is employed in the form of a single static bed in which case the process is only semicontinuous. In another embodiment, a feed of two or more static beds may be employed in a fixed bed contact with appropriate valving employed in the flow scheme so that the feed mixture is passed through one or more adsorbent beds while the desorbent material is passed through one or more of the other beds in the operation. The flow of said mixture and desorbent material may be effected in either an upward or downward flow through the adsorbent. The most commercially successful embodiment of the adsorptive type separation process comprises the countercurrent moving bed or simulated moving bed countercurrent flow scheme. In such a type of system, the adsorption and desorption operations are continuously taking place which allows both continuous production of an extract and raffinate stream along with the continual use feed and desorbent streams.

Various types of materials which may be employed as separation membranes have been shown in prior U.S. patents. For example, the incorporation of two components in a membrane system has been shown in U.S. Pat. Nos. 3,457,180, 3,878,104, 3,993,566, 4,032,454 and 4,341,605 which teach the use of structural supports or reinforcement fibers or fabrics to aid the membrane in resisting the high pressures which are utilized in a reverse osmosis process. U.S. Pat. No. 3,556,305 discloses a "sandwich" type reverse osmosis membrane comprising a porous substrate covered by a barrier layer, which in turn, is covered by a polymer or film bonded to the barrier layer by an adhesive polymeric layer. U.S. Pat. No. 3,862,030 discloses a polymeric matrix having an inorganic film such as silica dispersed throughout the matrix to impart a network of microvoids or pores of a size of about 0.01 to about 100 microns, which are capable of filtering microscopic or ultra-fine particles of submicron size. U.S. Pat. No. 4,302,334 discloses a membrane "alloy" comprising a hydrophobic fluorocarbon polymer blended with a polyvinyl alcohol polymer which imparts hydrophilic properties to the membrane.

U.S. Pat. No. 4,230,463 discloses a multicomponent membrane which may be useful for the separation of gases comprising a polymer coating on a porous separation membrane, the latter may also comprise a polymer such as polysulfone. However, the polysulfone support which is used to prepare this membrane is not unduly porous in nature and possesses a large ratio of total surface area to total pore cross-sectional area. The patent particularly discloses the use of membranes having ratios of total surface area to total pore cross-sectional areas of about 1000:1. The type of membrane which is disclosed in this patent may be conducive to high separation factors; however, the rate of passage of fluid through the membrane which constitutes the flux is greatly restricted. In addition, the patent discusses the separation of nonpolar gases as a primary function of the membrane.

Other types of membranes which may be employed to effect the separation of gases may comprise the mixed matrix type of membrane such as molecular sieves incorporated with polymeric membranes. One particular type of mixed matrix membrane comprises a type 5A (Linde) zeolite incorporated with a silicon rubber matrix. This type of membrane was disclosed in an article "*The Diffusion Time Lag in Polymer Membranes Containing Adsorptive Fillers*" in J. Polymer Sci.; Symposium #41, 79–93 (1973). This article teaches that the zeolite "filler" causes a time lag in reaching steady state permeation of the membrane by various gases due to the adsorption of the gases by the zeolite. It is taught in this article that once the zeolite becomes saturated by the permeate gas, a steady state rate of permeation through the membrane is reached so that the membrane selectivity is essentially the same as if the zeolite was not present.

As will hereinafter be shown in greater detail, I have now discovered that a multicomponent membrane which has been prepared in a certain manner may be utilized to effect a separation of polar gases from nonpolar gases. By utilizing this particular type of membrane, the solubility of the polar gas therein will be greatly enhanced, thus resulting in a high separation factor of the gases in conjunction with a high flux.

BRIEF SUMMARY OF THE INVENTION

This invention relates to a process for the separation of polar gases. More specifically, the invention is concerned with a process for the separation of polar gas from nonpolar gases utilizing a multicomponent membrane. The particular multicomponent membrane which is employed to effect the separation will possess the desirable characteristics which include a high flux rate and a high separation factor.

The separation of polar gases from nonpolar gases may constitute an important aspect which is attendant in commercial plant operations. For example, flue gases emanating from the combustion of various fuels will contain a mixture of gases such as carbon dioxide, nitrogen, oxygen and sulfur dioxide. The presence of sulfur dioxide may be detrimental to the environment and therefore it is incumbent upon the operator of the plant to separate this gas from other nonnoxious gases. Likewise, in refinery operations, certain processes result in the production of gases during the refining operation. In many instances, due to the particular source of the hydrocarbonaceous mixture which is undergoing processing, it will contain hydrogen sulfide. It is therefore necessary to separate and remove this gas from other refinery gases such as hydrocarbon gases including methyl, propyl, ethyl, etc., and thus render the hydrocarbon gases suitable for further use in petrochemical processes.

It is therefore an object of this invention to provide a process for the separation of polar gases from nonpolar gases.

A further object of this invention is to provide a separation process utilizing, as separation means therefor, a multicomponent membrane which possesses the capability of effecting a viable separation process whereby polar gases are removed from nonpolar gases.

In one aspect an embodiment of this invention is found in a multi-component membrane, useful for the separation of fluid components of a fluid feed mixture, comprising a mixture of a glycol plasticizer and an organic polymer cast on a porous support which has been subjected to treatment prior to the casting of said mixture thereon by contact with a polyhydric alcohol.

Another embodiment of this invention is found in a process for the separation of a polar gas from a nonpolar gas in a feed mixture containing said gases which comprises contacting said mixture with the upstream face of a multicomponent membrane which comprises a mixture of a glycol plasticizer having a molecular weight of from about 200 to about 600 and an organic polymer cast on a porous support, said support having a ratio of total surface area to total pore cross-sectional area of from about 5:1 to about 900:1 and which has been subjected to pretreatment prior to the casting of said mixture thereon by contact with a polyhydric alcohol at separation conditions, in which said polar gas has a greater steady state permeability than said nonpolar gas, and recovering the permeate which emanates from the downstream face of said membrane, said permeate comprising a product mixture in which the proportion of polar gas to non-polar gas is greater than the proportion of polar gas to nonpolar gas in said feed mixture.

A specific embodiment of this invention is found in a multicomponent membrane which comprises a mixture of a glycol plasticizer having a molecular weight of from about 200 to about 600 such as polyethylene glycol and an organic polymer such as silicon rubber cast upon a porous polysulfone support which has a ratio of total surface area to total pore cross-sectional area of from about 5:1 to about 900:1, said support having been subjected to treatment with glycerol prior to the casting of said mixture thereon.

Another specific embodiment of this invention is found in a process for the separation of hydrogen sulfide from a mixture of hydrocarbon gases in a feed mixture containing said gases which comprises contacting said mixture with the upstream face of a multicomponent membrane comprising a mixture of polyethylene glycol and silicon rubber cast upon porous polysulfone, said polysulfone having been subjected to pretreatment prior to the casting of said mixture thereon by contact with glycerol, at ambient temperatures and a pressure in the range of from about 10 to about 500 pounds per square inch gauge, in which said hydrogen sulfide has a greater steady state permeability than said hydrocarbon gases, and recovering the permeate which emanates from the downstream face of said membrane, said permeate comprising a product mixture in which the proportion of hydrogen sulfide to hydrocarbon gases is greater than the proportion of hydrogen sulfide to hydrocarbon gases in said feed mixture.

Other objects and embodiments will be found in the following detailed description of the invention.

DETAILED DESCRIPTION OF THE INVENTION

As hereinbefore set forth, the present invention is concerned with a membrane which is useful for the separation of polar gas from a mixture of polar and nonpolar gases as well as to a process for effecting the aforesaid separation. The separation of polar gases from mixtures thereof constitutes a desirable commercial process, such separations including sulfur dioxide from flue gases, hydrogen sulfide from refinery off-gases and ammonia from mixtures of nitrogen and hydrogen. The separation of polar gases from nonpolar gases may be effected by passing a feed mixture of polar gases and nonpolar gases over the upstream face of a multicomponent membrane of the type hereinafter set forth in greater detail. The aforesaid separation of the gases may be effected over a wide range of separation conditions. In the preferred embodiment of the invention, the process is effected at mild operating conditions which include ambient temperatures and moderate pressures which may range from about 10 to about 500 pounds per square inch gauge (psig) on the upstream face of the multi-component membrane. The use of such mild operating conditions and especially moderate pressures is in marked contrast to other separation processes such as reverse osmosis processes which require that the osmotic pressure be exceeded to a somewhat greater extent, which in some instances would require utilizing a pressure of several thousand psig.

The multicomponent membrane which is utilized to effect the separation of polar gases from nonpolar gases will comprise a mixture of a glycol plasticizer which possesses a molecular weight of from about 200 to about 600 and an organic polymer, said mixture being cast upon a porous support of a particular type hereinafter set forth in greater detail which has been pretreated prior to the casting of the mixture thereon, with a polyhydric alcohol. By utilizing such a support which has been pretreated prior to casting of the aforesaid mixture thereon, it is possible to obtain selectivities of gases which far exceed the selectivities which are obtained when utilizing other membranes. By treating the porous support with a polyhydric alcohol, it is possible to alter the micropores of the porous support. This alteration of the micropores will have a three-fold advantage in that (1) it will tend to prevent or slow down the transport of the nonpolar gases through the membrane while at the same time (2) enhance the solubility of the polar gas in the membrane phase and (3) it unifies the coating materials on the porous polysulfone support. This fortuitous combination will thereby permit a greater selectivity of the gases while maintaining the flux of the gases through the membrane at an acceptable rate.

As hereinbefore set forth, the multicomponent membrane will incorporate a glycol plasticizer and an organic polymer cast upon a porous organic polymer support which has been pretreated with a polyhydric alcohol. The plasticizer which is employed comprises a liquid having a high boiling point and a low partial pressure which is dispersed uniformly as an emulsion in the organic polymer, or in homogeneous phase with a solution of the polymer. A particularly effective plasticizer which may be used for the separation of gases comprises a glycol having a molecular weight of from about 200 to about 600 incorporated in an amount preferably from about 5% to about 50% by weight with a polymer such as silicon rubber.

Some representative examples of glycol plasticizers which may be employed will include tetraethylene glycol (TEG), polyethylene glycol (PEG), propylene glycol, polypropylene glycol, etc.

The porous support upon which the aforesaid mixture is cast comprises a polymer such as cellulose acetate or polysulfone, said support having a ratio of total surface area to total pore cross-sectional area of from about 5:1 to about 900:1. This support is pretreated by contact with a high molecular weight poly alcohol prior to having the mixture of glycol and polymer cast thereon. The treatment is effected by contacting a porous support with the polyhydric alcohol. Some examples of polyhydric alcohols which may be employed to treat the porous support will include glycerol, pentaerythritol, ethylene glycol, propylene glycol, catechol, etc. After treatment of the porous support for a period of time sufficient to thoroughly impregnate said support, which period of time may range from about 1 to about 4 or more hours in duration, the excess polyhydric alcohol is removed and the porous support is allowed to dry. The multicomponent membrane which is used in the process of this invention may be prepared by any means known in the art. For example, one method for preparing the desired membrane is to treat the porous support in a wet condition with a polyhydric alcohol in an appropriate apparatus for a period of time following which the excess polyhydric alcohol is removed and the treated support is allowed to dry at room temperature. Following this, a solution or emulsion consisting of the glycol plasticizer and the organic polymer is formed in an appropriate solvent such as a fluorinated hydrocarbon as exemplified by trifluorotrichloroethane. After degassing the solution, which may be accomplished in a vacuum, the emulsion or solution is cast upon the treated porous polymeric support. In the preferred embodiment of the invention, the concentration of the organic polymer in the solvent solution with the glycol plasticizer will be present in a range of from about 0.5% to about 50% by weight in order to obtain a membrane which possesses a maximum flux capability. By subjecting the emulsion or solution of the glycol plasticizer and the organic polymer to a degassing step by exposure to at least a partial vacuum prior to casting on the porous polymer support, the unexpected or inadvertent formation of pin holes or voids within the membrane is minimized.

The casting of the mixture on the treated porous support is effected by pouring or spreading the emulsion or solution of plasticizer and organic polymer onto the porous polymer support in such a way so that a desired thickness of the casting components on the surface of the porous support may be achieved. Thereafter, the membrane is cured by exposing it to an elevated temperature which may range up to about 100° C. for a period of time which is sufficient to evaporate substantially all of the solvent. As an alternative, but still viable method of forming the membrane, the glycol plasticizer may be poured or coated onto the treated porous support in a first step followed by casting the organic polymer onto the coated support. Following this, the curing of the multicomponent membrane is then effected in a manner similar to that hereinbefore set forth.

The separation of the polar gases from nonpolar gases in the process of the present invention results from the fact that the different components, that is, the polar and nonpolar gases which are present in a feed mixture, will pass through a properly selected membrane at different rates due to different diffusivity and solubility characteristics which may be collectively referred to as permeability of each component in the feed mixture. This phenomenon may be expressed in terms of separation factors as defined in the formula:

$$\alpha\, A/B = \frac{\text{Flux of } A}{\text{Flux of } B}$$

where both fluxes are measured at the same pressure differential.

$\alpha A/B$ — separation factor

The higher the separation factor, the more efficient separation will be achieved.

As was hereinbefore set forth, due to the treatment of the porous polymeric support with a polyhydric alcohol prior to casting the mixture of glycol plasticizer and organic polymer on said support, a surprising and unexpected increase will occur with regard to the separation factor of the membrane for the feed mixture containing the polar gases and nonpolar gases. In this instance, the polar gases will possess a greater steady state permeability than is possessed by the nonpolar gases, the passage of the latter through the multicomponent membrane being retained due to the alteration of the micropores of the porous support. This factor will contribute to the greater separation factor and flux which is obtained when utilizing the multicomponent membrane of the present invention.

The following examples are given for purposes of illustrating the preparation of the novel multicomponent membrane of the present invention and to the separation process utilizing this membrane. However, it is to be understood that these examples are merely illustrative in nature and that the present process is not necessarily limited thereto.

EXAMPLE I

To illustrate the advantages with respect to the separation factors which are enjoyed when utilizing a multicomponent membrane of the present invention in contrast with other multicomponent membranes, a membrane was prepared by preparing an emulsified solution. The solution was prepared by admixing 1.08 grams of a silicon rubber sold under the trade name RTV-615A and 0.12 gram of a silicon rubber sold under the trade name RTV-615B with 0.3 gram of 400MW polyethylene glycol in 18.6 grams of a solvent sold under the trade name Freon TF. The emulsified solution was poured over a porous polysulfone under vacuum and after coating, the membrane was cured for a period of 30 minutes at a temperature of 82° C. This membrane was labeled "A."

A multicomponent membrane of the present invention was also prepared by soaking a wet porous polysulfone in a solution containing 15% by weight of glycerol for a period of two hours followed by drying for a period of 10 hours at room temperature. The treated polysulfone support was then coated with an emulsified solution similar in nature to that described in the above paragraph and after coating the polysulfone, the membrane was then cured at a temperature of 82° C. for a period of 30 minutes. This membrane was labeled "B."

EXAMPLE II

The multicomponent membranes which were prepared according to Example I above were then tested by utilizing a sample of each membrane having a diameter of 7.5 cm placed in a test apparatus. The gas to be tested was passed through the membrane under a pressure of 50 psig at ambient temperature. The flux and selectivity for each pure gas, both polar and nonpolar in nature was measured. The results of this test are set forth in Table 1 below in which ammonia as the polar gas was compared with nitrogen and hydrogen as the nonpolar gas.

TABLE 1

| MEMBRANE | A | B |
|---|---|---|
| Selectivity | | |
| $\alpha(NH_3/N_2)$ | 1100 | 2190 |
| $\alpha(NH_3/N_2)$ | 79 | 199 |
| Flux$^a$ | | |
| $(\overline{P}/\delta)NH_3$ | $2.25 \times 10^{-4}$ | $2.89 \times 10^{-4}$ |

$^a$cm$^3$(STP)/cm$^2$-sec-cm(H$_g$)

It is apparent from a comparison of the results obtained when using the multicomponent membrane of the present invention in which the support had been pretreated with glycerol as compared to a multicomponent membrane in which the support was not pretreated prior to the casting of the mixture thereon that the membrane of the present invention exhibited a much greater selectivity with respect to the separation of ammonia and nitrogen as well as ammonia and hydrogen than did the untreated porous support membrane.

EXAMPLE III

In this example, the multicomponent membranes labeled "A" and "B" were subjected to a test to determine the flux and selectivity for the separation of hydrogen sulfide, a polar gas, from methane, hydrogen and carbon dioxide, nonpolar gases. The pure gases were again passed through the two membranes under a pressure of 50 psig at ambient temperature. The results of these tests are set forth in Table 2 below:

TABLE 2

| MEMBRANE | A | B |
|---|---|---|
| Selectivity | | |
| $\alpha(H_2S/CH_4)$ | 140 | 162 |
| $\alpha(H_2S/H_2)$ | 27 | 74 |
| $\alpha(H_2S/CO_2)$ | 5.7 | 8.1 |
| Flux | | |
| $(\overline{P}/\delta)H_2S$ | $7.81 \times 10^{-5}$ | $10.7 \times 10^{-5}$ |

The above Table clearly discloses that the novel membrane of the present invention, that is, a mixture of a glycol plasticizer and an organic polymer coated on a porous support which has been pretreated with a polyhydric alcohol possesses greater selectivity as well as a greater flux with respect to the polar and nonpolar gases.

I claim as my invention:

1. A multicomponent membrane, useful for the separation of fluid components of a fluid feed mixture, comprising a mixture of a glycol plasticizer and an organic polymer cast on a porous support which has been subjected to treatment prior to the casting of said mixture thereon by contact with a polyhydric alcohol.

2. The multicomponent membrane as set forth in claim 1 in which said glycol plasticizer has a molecular weight of from about 200 to about 600.

3. The multicomponent membrane as set forth in claim 1 in which said porous support has a ratio of total surface area to total pore cross-sectional area of from about 5:1 to about 900:1.

4. The multicomponent membrane as set forth in claim 1 in which said porous support is cellulose acetate.

5. The multicomponent membrane as set forth in claim 1 in which said porous support is polysulfone.

6. The multicomponent membrane as set forth in claim 1 in which said organic polymer is a silicon rubber.

7. The multicomponent membrane as set forth in claim 1 in which said polyhydric alcohol is glycerol.

8. The multicomponent membrane as set forth in claim 1 in which said polyhydric alcohol is ethylene glycol.

9. The multicomponent membrane as set forth in claim 1 in which said polyhydric alcohol is propylene glycol.

10. The multicomponent membrane as set forth in claim 1 in which said polyhydric alcohol is pentaerythritol.

11. A process for the separation of a polar gas from a nonpolar gas in a feed mixture containing said gases which comprises contacting said mixture with the upstream face of a multicomponent membrane which comprises a mixture of a glycol plasticizer having a molecular weight of from about 200 to about 600 and an organic polymer cast on a porous support, said support having a ratio of total surface area to total pore cross-sectional area of from about 5:1 to about 900:1 and which has been subjected to pretreatment prior to the casting of said mixture thereon by contact with a polyhydric alcohol, at separation conditions, in which said polar gas has a greater steady state permeability than said nonpolar gas, and recovering the permeate which emanates from the downstream face of said membrane, said permeate comprising a product mixture in which the proportion of polar gas to nonpolar gas is greater than the proportion of polar gas to nonpolar gas in said feed mixture.

12. The process as set forth in claim 11 in which said separation conditions include ambient temperatures and a pressure in the range of from about 10 to about 500 pounds per square inch gauge.

13. The process as set forth in claim 11 in which said porous support comprises cellulose acetate.

14. The process as set forth in claim 11 in which said porous support comprises polysulfone.

15. The process as set forth in claim 11 in which said organic polymer comprises silicon rubber.

16. The process as set forth in claim 11 in which said polyhydric alcohol comprises glycerol.

17. The process as set forth in claim 11 in which said polyhydric alcohol comprises ethylene glycol.

18. The process as set forth in claim 11 in which said polyhydric alcohol comprises propylene glycol.

19. The process as set forth in claim 11 in which said polyhydric alcohol comprises pentaerythritol.

20. The process as set forth in claim 11 in which said polar gas is ammonia and said nonpolar gas is a mixture of nitrogen and hydrogen.

21. The process as set forth in claim 11 in which said polar gas is hydrogen sulfide and said nonpolar gas is a mixture of hydrocarbon gases.

22. The process as set forth in claim 11 in which said polar gas is sulfur dioxide and said nonpolar gas is a mixture of carbon dioxide, nitrogen and hydrogen.

* * * * *